(12) United States Patent
Hu et al.

(10) Patent No.: US 11,811,117 B2
(45) Date of Patent: Nov. 7, 2023

(54) AIR SUPPLY SYSTEM

(71) Applicant: Ceres Intellectual Property Company Limited, Horsham West (GB)

(72) Inventors: Changming Hu, Shandong (CN); Youpeng Chen, Shandong (CN); Xiaowen Sun, Shandong (CN); Xiao Yu, Shandong (CN)

(*) Notice: Subject to any disclaimer, the term of this patent is extended or adjusted under 35 U.S.C. 154(b) by 0 days.

(21) Appl. No.: 17/764,536

(22) PCT Filed: Sep. 30, 2020

(86) PCT No.: PCT/IB2020/059160
§ 371 (c)(1),
(2) Date: Mar. 29, 2022

(87) PCT Pub. No.: WO2021/064601
PCT Pub. Date: Apr. 8, 2021

(65) Prior Publication Data
US 2022/0344690 A1    Oct. 27, 2022

(30) Foreign Application Priority Data
Sep. 30, 2019  (CN) .......................... 201921663425.5

(51) Int. Cl.
| | | |
|---|---|---|
| *H01M 8/0612* | (2016.01) | |
| *H01M 8/04014* | (2016.01) | |
| *H01M 8/0432* | (2016.01) | |
| *H01M 8/2465* | (2016.01) | |
| *H01M 8/2425* | (2016.01) | |
| *H01M 8/12* | (2016.01) | |

(52) U.S. Cl.
CPC ..... *H01M 8/0618* (2013.01); *H01M 8/04014* (2013.01); *H01M 8/04022* (2013.01); *H01M 8/04373* (2013.01); *H01M 8/2465* (2013.01); *H01M 8/2425* (2013.01); *H01M 2008/1293* (2013.01)

(58) Field of Classification Search
CPC .......... H01M 8/0618; H01M 8/04014; H01M 8/04022; H01M 8/04373; H01M 8/2465
See application file for complete search history.

(56) References Cited

U.S. PATENT DOCUMENTS

| | | | |
|---|---|---|---|
| 2002/0025458 A1 | 2/2002 | Faville et al. | |
| 2015/0357665 A1 | 12/2015 | Braun et al. | |
| 2016/0141692 A1* | 5/2016 | Barnard | H01M 8/04014 |
| | | | 429/425 |

FOREIGN PATENT DOCUMENTS

| | | |
|---|---|---|
| WO | 2015069754 A2 | 5/2015 |
| WO | 2015069754 A3 | 9/2015 |

(Continued)

OTHER PUBLICATIONS

WIPO; International Search Report and Written Opinion dated Jan. 12, 2021 in Application No. PCT/IB2020/059160.

*Primary Examiner* — Olatunji A Godo
(74) *Attorney, Agent, or Firm* — Snell & Wilmer L.L.P.

(57) ABSTRACT

An air supply system, comprising at least two air blowers and at least two communication valves; wherein one air blower is connected to a main air passage through the corresponding communication valve; and at least one other is connected to a reformer air passage and a stack air passage through at least one other communication valve, respectively. At least two air blowers are provided to connect the at least two communication valves.

11 Claims, 2 Drawing Sheets

(56) References Cited

FOREIGN PATENT DOCUMENTS

| | | |
|---|---|---|
| WO | 2015069754 A4 | 3/2016 |
| WO | 2019055472 A1 | 3/2019 |

* cited by examiner

AIR SUPPLY SYSTEM

This application is a national stage entry of International Patent Application No. PCT/IB2020/059160, filed 30 Sep. 2020, entitled "AIR SUPPLY SYSTEM," which claims priority to Chinese Patent Application No. 201921663425.5, filed on 30 Sep. 2019, the disclosures of which are hereby incorporated by reference in their entirety.

TECHNICAL FIELD

The present invention relates to the technical field of fuel cells, more particularly to an air supply system.

BACKGROUND ART

Solid Oxide Fuel Cell (SOFC) is a full solid chemical power generation device, which directly converts the chemical energy stored in fuel and oxidant into electrical energy efficiently and in an environmentally friendly mode.

The SOFC needs to use air blowers to provide a main air passage, a reformer air passage and a stack air passage with the air. When the air is supplied to the three passages (see FIG. 1) one air blower is used to connect the three passages by three butterfly valves. As a result, the air blowers can be damaged due to excessive back pressure on the air blowers when all the three butterfly valves cannot be opened.

SUMMARY OF THE INVENTION

The present invention provides an air supply system to address the problem in which, if one air blower is connected to the three passages by three butterfly valves, the air blowers will be damaged due to excessive back pressure on the air blowers when all the three butterfly valves cannot be opened.

This invention provides an air supply system, comprising at least two air blowers and at least two communication valves; one air blower is connected to a main air passage through the corresponding communication valve, and at least one other is connected to a reformer air passage and a stack air passage through at least one communication valve, respectively.

The number of air blowers can be two; the number of communication valves can be two; and the communication valves include a non-return valve and a three-way valve. One air blower can be connected to the main air passage through the non-return valve, and the other one connected to the reformer air passage and the stack air passage through the three-way valve, respectively.

An output end of the non-return valve can be connected to an input end of the reformer; and an output end of the three-way valve connected to the input end of the reformer and an input end of a solid oxide fuel cell (SOFC) stack, respectively.

The number of air blowers can be three; the number of communication valves three; and the communication valves can include three non-return valves. One of the other two air blowers can be connected to the reformer air passage through one of the non-return valves, and the other one connected to the stack air passage through another non-return valve.

The output ends of the two non-return valves can be connected to the input end of the reformer; and an output end of the third non-return valve connected to an input end of the SOFC stack.

The flows, volumes and power consumptions of the three air blowers can be different.

The system can further comprise an air filter; and an output end of the air filter can be connected to the input ends of the air blowers.

The system can further comprise a heat exchanger. An input end of the heat exchanger can be connected to an output end of the non-return valve connecting the main air passage; and an output end of the heat exchanger connected to the input end of the reformer.

The system can further comprise a burner. An input end of the burner can be connected to an output end of the SOFC stack; and an output end of the burner connected to the input end of the heat exchanger.

The present invention provides an air supply system, the air supply system comprises at least two air blowers and at least two communication valves; one air blower is connected to a main air passage through the corresponding communication valve, and at least one other is connected to a reformer air passage and a stack air passage through at least one communication valve, respectively. At least two air blowers are provided to connect the at least two communication valves. In comparison with one air blower connecting three butterfly valves, the air blower damage probability is lowered when at least two air blowers receive less back pressure.

BRIEF DESCRIPTION OF THE DRAWINGS

The drawings used in the description will be briefly described below. The drawings in the description below are just some embodiments of the present invention.

DETAILED DESCRIPTION

Embodiments of the present invention will be described below in conjunction with the drawings. The described embodiments are only some, not all of the embodiments of the present invention.

An embodiment of the present invention provides an air supply system. The air supply system is used for respectively supplying air to a fuel cell module (FCM) and includes a main circuit air passage, a Ref (Reformer) air passage and a Stk (Stack) air passage.

Figure 1:
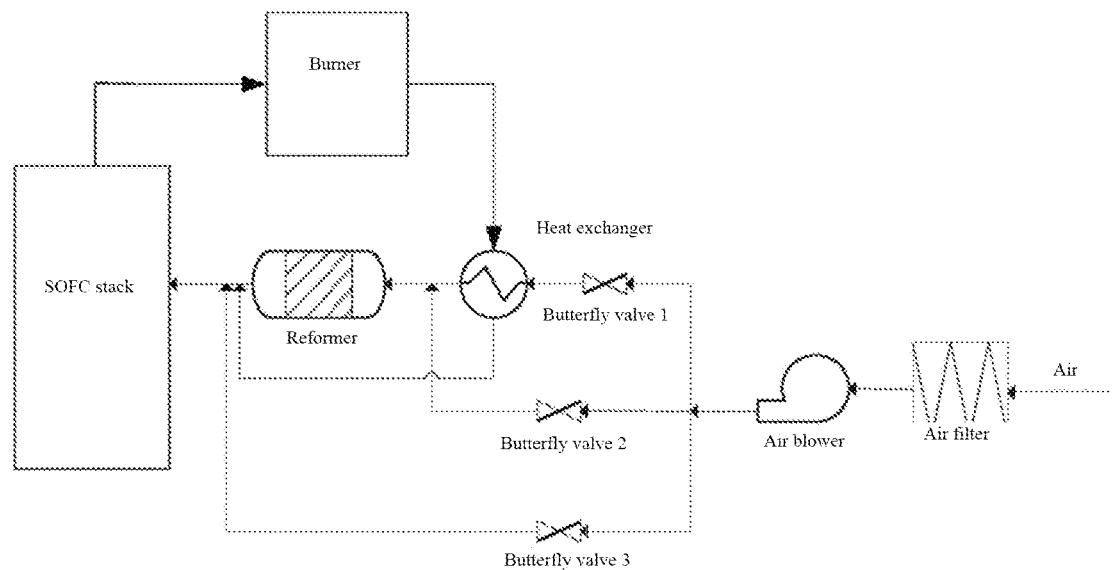
FIG. 1 is an application scenario diagram of a known air supply system.
Figure 2:
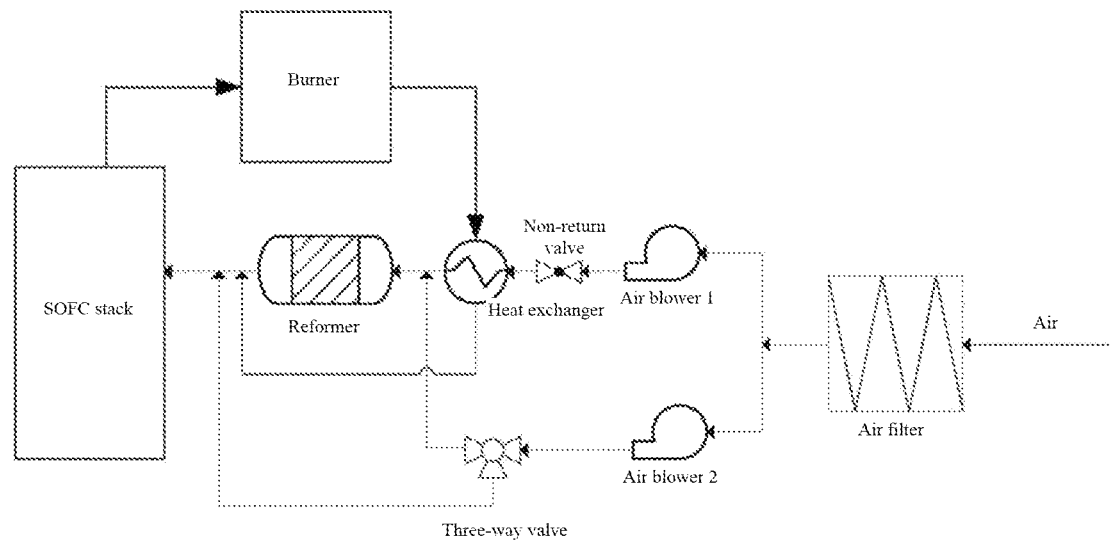
FIG. 2 is a structural schematic view of an air supply system.

Referring to FIG. 2, the main air passage is connected to the reformer in the FCM for providing heat and oxygen for a reforming reaction of the reformer.

The Ref air passage is connected to the reformer in the FCM for controlling a reforming reaction rate. For example, controlling the reforming reaction rate of the reformer (e.g. 30%) by controlling a temperature of the reformer (e.g. 450° C.).

The Stk air passage is connected to an SOFC (solid oxide fuel cell) in the FCM for adjusting a temperature (e.g. to 580° C.) before entering a Stk inlet to make a fuel reforming rate of the stack reach a maximum (e.g. the reforming rate is 70%).

Figure 3:
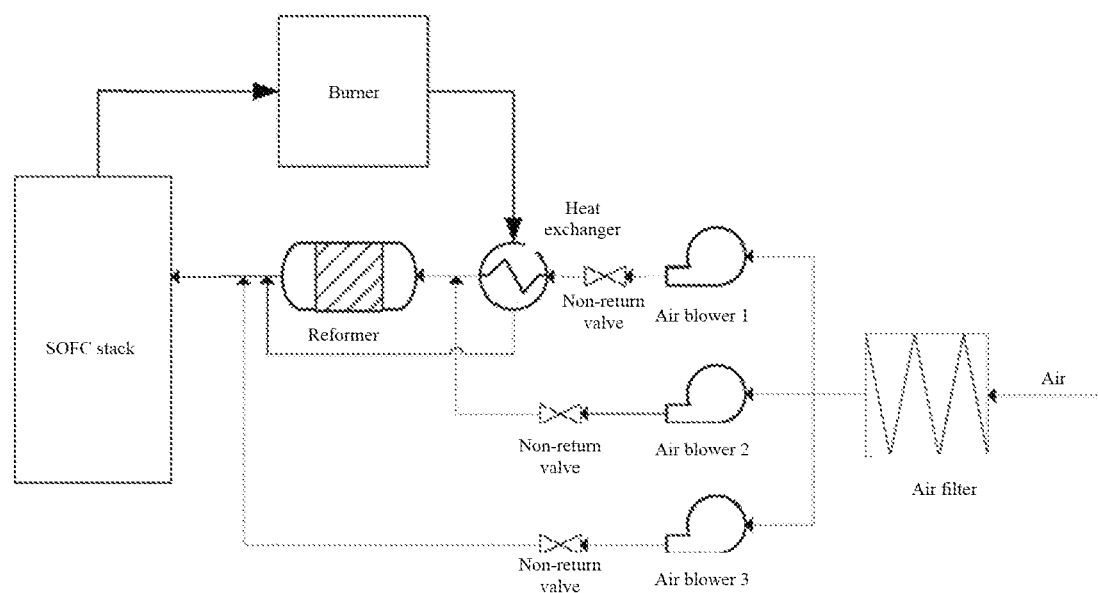
FIG. 3 is a structural schematic view of another air supply system.

An embodiment of the invention, referring to FIGS. 2 and 3, comprises at least two air blowers and at least two communication valves. One air blower is connected to a main air passage through the corresponding communication valve, and at least one other is connected to a reformer air passage and a stack air passage through at least one communication valve, respectively. In actual use, the communication valves can be non-return valves or three-way valves. The non-return valves can be used to prevent air from reflowing.

FIG. 2 gives a structural view of two air blowers and two communication valves. It can be seen from FIG. 2 that the air blower 1 is connected to the main air passage through the non-return valve 1, and the air blower 2 is connected to the Ref air passage and the Stk air passage (the Stk front air passage) through the three-way valve. An output end of the non-return valve is connected to an input end of the reformer; an output end of the three-way valve is connected to the input end of the reformer and an input end of a solid oxide fuel cell (SOFC) stack, respectively.

The air blower 1 is provided to connect the main air passage, while the air blower 2 is provided to connect the Ref air passage and the Stk air passage due to the fact that most heat of the FCM is provided by the main air passage, and the Ref air passage and the Stk air passage are only used for temperature regulation, and thus the Ref air passage and the Stk air passage use the same air blower 2, and the main air passage uses the separate air blower 1.

FIG. 3 gives a structural view of three air blowers and three communication valves. It can be seen from FIG. 3 that the air blower 1 is connected to the main air passage through the non-return valve 1, the air blower 2 is connected to the Ref air passage by the non-return valve, and the air blower 3 is connected to the Stk air passage (the Stk front air passage) by the non-return valve. That is to say, one air blower is connected to one passage, so that every passage can realize accurate air flow regulation. The output ends of the two non-return valves are connected to the input end of the reformer; an output end of the third non-return valve is connected to an input end of the SOFC stack.

When three air blowers are utilized, the flows, volumes and power consumptions of the three air blowers are different. A main air blower has a flow range of about 100 g/s, a power consumption of about 1.8 KW, and a volume of being equivalent to an A4 paper. Each of the other two bypass air blowers has a flow of about 20 g/s, a power of almost only dozens of watts, and a volume of being equivalent to half of the A4 paper only.

The above two systems are structurally disposed and are easy to operate. The air supply system further comprises an air filter; an output end of the air filter is connected to the input ends of the air blowers, and the air filter is used for providing clean air. Taking the three air blowers for example, when air from an air inlet respectively enters three air blowers with different flows, volumes and power consumptions through the air filter. When the system is purged at an earlier stage, the three air blowers operate simultaneously. The function of the non-return valve is to prevent air within the system from reflowing reversely. In a heating phase, the air blower 1 will continuously provide the FCM with the air according to certain air flow and pressure (e.g. an air flow of 150 g/s and a pressure at an outlet of each air blower of 32 kPa). The air blower 2 and the air blower 3 are in a standby state. When a heating speed of the stack is too fast to meet the system heating demand, the air blower 2 and the air blower 3 are required to join the work, thereby lowering the heating speed of the stack, and ensuring a temperature difference range between an inlet and an outlet of the stack to be within an acceptable range.

When the temperature in a steady state, the inlet and outlet temperatures of the stack have been in the steady state. At this time, the air blower 1 will lower air flow (e.g. 65 g/s) and pressure (e.g. outlet pressure: 8 kPa) to continuously provide the stack with air. The air blower 2 and the air blower 3 will perform on and off according to the feedback of the outlet temperature (e.g. outlet temperature of the stack: 580±5° C.) of the SOFC stack.

The air supply system further comprises a heat exchanger; an input end of the heat exchanger is connected to an output end of the non-return valve connecting the main air passage. An output end of the heat exchanger is connected to the input end of the reformer. The heat exchanger is used for heating air to meet a temperature demand of the reformer.

The air supply system further comprises a burner. An input end of the burner is connected to an output end of the SOFC stack; an output end of the burner is connected to the input end of the heat exchanger. The burner provides the heat exchanger with a high-temperature hot source.

In this embodiment, the three air blowers are used. Moreover, two air blowers can be applied if the air blowers are insufficient. Three air blowers can be applied for controlling to prevent, after all butterfly valves are closed, the danger of damaging the air blowers due to excessive back pressure if the air blowers are started. Before every start of the air blowers, whether to open the non-return valves of the three air passages must be inspected. The three air blowers are used to respectively control the air from the three passages, thereby precisely controlling mass flow, temperature and humidity of every path, and lowering control accuracy decrease after the non-return valve is used for a long time. The mixed air flows to the stack to fully react to improve the system efficiency by realizing the demands of controlling the outlet temperature and the inlet air mass flow of the stack.

The three air blowers are provided to connect the three non-return valves (the function of the non-return valves in the system is to prevent the air in the system from re-flowing to the air blowers), and has the following advantages in comparison with a condition in which one air blower is connected to the three butterfly valves (the function of the butterfly valve is to control the distribution of the flow at the outlets of the air blowers, and an opening accuracy of the butterfly valves has an influence on the flow distribution precision):

1. No butterfly valves are required to distribute the flow.
2. The condition, in which the air blowers are damaged by excessive back pressure when the butterfly valves are not opened is reduced.
3. The flow distribution accuracy is higher.
4. It is convenient to control if the air blowers feedback the flow in real time.
5. The maximum process demands are met.

When the two air blowers are used, one air blower is required in a main air passage, another air blower distributes air flow in front of the Stk and the Ref by a three-way solenoid valve (three-way valve). The three-way solenoid valve has a higher control precision than that of the butterfly valves. Moreover, compared with the three air blowers, the two air blowers have the need to inspect whether the three-way solenoid valve communicates normally in advance due to the danger of damaging the air blowers. Otherwise, when the air blowers are started, the three-way valve fails to distribute the flow as required but are in a closing state. In this way, the air blowers will be damaged due to excessive back pressure.

In this embodiment, the air supply system comprises at least two air blowers and at least two communication valves. One air blower is connected to a main air passage through the corresponding communication valve, and the other at least one is connected to a reformer air passage and a stack air passage through at least one communication valve, respectively. At least two air blowers are provided to connect the at least two communication valves. In comparison with one air blower connecting three butterfly valves, the air blower damage probability is lowered when at least two air blowers receive less back pressure.

The three air blowers are applied to performing temperature regulation for the FCM, which can regulate the air flow in every line effectively in real time, so that the FCM can operate steadily in a heating process.

Various modifications to these embodiments will be apparent. The general principle defined herein can be implemented in other embodiments without departing from the scope of the present invention.

The invention claimed is:

1. An air supply system, comprising:
a first air blower and a second air blower; and
a first communication valve and a second communication valve;
wherein
the first air blower is connected to a main air passage through the first communication valve, wherein the first communication valve is a non-return valve; and
the second air blower is connected to a reformer air passage and a stack air passage through the second communication valve, respectively, wherein the second communication valve is a three-way valve.

2. The air supply system according to claim 1, wherein
an output end of the non-return valve is connected to an input end of the reformer; and
an output end of the three-way valve is connected to the input end of the reformer and an input end of a solid oxide fuel cell (SOFC) stack, respectively.

3. An air supply system according to claim 1, comprising:
a first air blower, a second air blower and a third air blower; and
a first communication valve, a second communication valve and a third communication valve;
wherein each of the communication valves comprises a non-return valve, corresponding to a first non-return valve, a second non-return valve, and a third non-return valve;
the first air blower is connected to a main air passage through the first non-return valve;
the second air blower is connected to a reformer air passage through the second non-return valve, and the third air blower is connected to a stack air passage through the third non-return valve.

4. The air supply system according to claim 3, wherein the output ends of the first and the second non-return valves are connected to the input end of the reformer; and an output end of the third non-return valve is connected to an input end of a solid oxide fuel cell SOFC stack.

5. The air supply system according to claim 3, wherein the flows, volumes and power consumptions of the first, second, and third air blowers are different.

6. The air supply system according to claim 3, wherein the system further comprises an air filter, and an output end of the air filter is connected to the input ends of the first air blower, the second air blower and the third air blower.

7. The air supply system according to claim 3, further comprising a heat exchanger;
wherein
an input end of the heat exchanger is connected to an output end of the first non-return valve connecting the main air passage; and
an output end of the heat exchanger is connected to the input end of the reformer.

8. The air supply system according to claim 7, further comprising a burner;
wherein
an input end of the burner is connected to an output end of a solid oxide fuel cell SOFC stack; and
an output end of the burner is connected to the input end of the heat exchanger.

9. The air supply system according to claim 1, wherein the system further comprises an air filter, and an output end of the air filter is connected to input ends of the first and second air blowers.

10. The air supply system according to claim 1, further comprising a heat exchanger;
wherein
an input end of the heat exchanger is connected to an output end of the non-return valve connecting the main air passage; and
an output end of the heat exchanger is connected to the input end of the reformer.

11. The air supply system according to claim 10, further comprising a burner;
wherein
an input end of the burner is connected to an output end of a solid oxide fuel cell (SOFC) stack; and
an output end of the burner is connected to the input end of the heat exchanger.

* * * * *